United States Patent
Sako et al.

(10) Patent No.: US 9,245,389 B2
(45) Date of Patent: Jan. 26, 2016

(54) INFORMATION PROCESSING APPARATUS AND RECORDING MEDIUM

(71) Applicant: Sony Corporation, Tokyo (JP)

(72) Inventors: Yoichiro Sako, Tokyo (JP); Takatoshi Nakamura, Kanagawa (JP); Hiroyuki Hanaya, Kanagawa (JP); Kazuhiro Watanabe, Tokyo (JP); Kazuyuki Sakoda, Chiba (JP); Mitsuru Takehara, Tokyo (JP); Kazunori Hayashi, Tokyo (JP); Yasunori Kamada, Kanagawa (JP); Takayasu Kon, Tokyo (JP); Akira Tange, Tokyo (JP); Tomoya Onuma, Shizuoka (JP); Yuki Koga, Tokyo (JP); Kohei Asada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 65 days.

(21) Appl. No.: 14/093,877

(22) Filed: Dec. 2, 2013

(65) Prior Publication Data

US 2014/0160129 A1    Jun. 12, 2014

(30) Foreign Application Priority Data

Dec. 10, 2012  (JP) .................................. 2012-269270

(51) Int. Cl.
| | |
|---|---|
| *G06T 15/00* | (2011.01) |
| *G06T 19/00* | (2011.01) |
| *G06F 3/01* | (2006.01) |
| *H04N 13/04* | (2006.01) |

(52) U.S. Cl.
CPC .............. *G06T 19/006* (2013.01); *G06F 3/011* (2013.01); *G06T 19/003* (2013.01); *H04N 13/044* (2013.01)

(58) Field of Classification Search
CPC .... G06F 3/011; H04N 13/044; G06T 19/006; G06T 19/003
USPC ............. 345/427, 8, 156, 158, 162, 592, 620; 348/148, 161, 169; 463/9, 31
See application file for complete search history.

(56) References Cited

U.S. PATENT DOCUMENTS

| | | | | |
|---|---|---|---|---|
| 7,312,766 | B1 * | 12/2007 | Edwards ........................... | 345/8 |
| 8,556,695 | B2 * | 10/2013 | Nishimura et al. ............... | 463/9 |
| 8,696,451 | B2 * | 4/2014 | Nimura et al. ................... | 463/31 |
| 8,758,021 | B2 * | 6/2014 | Takahashi ...................... | 434/262 |

FOREIGN PATENT DOCUMENTS

JP    11-161812    6/1999

* cited by examiner

*Primary Examiner* — Phu K Nguyen
(74) *Attorney, Agent, or Firm* — Hazuki International, LLC

(57) ABSTRACT

There is provided an information processing apparatus including a display control unit configured to include a first display control mode in which control is performed in a manner that a first image from a user viewpoint, which is captured by a first imaging unit, is displayed on a display unit or control is performed in a manner that the display unit is transmissive, and a second display control mode in which control is performed in a manner that a second image captured by a second imaging unit including a user within an angle of view is displayed on the display unit, and a switching control unit configured to perform control in response to an instruction from the user in a manner that a display control mode of the display control unit is switched from the first display control mode to the second display control mode.

16 Claims, 13 Drawing Sheets

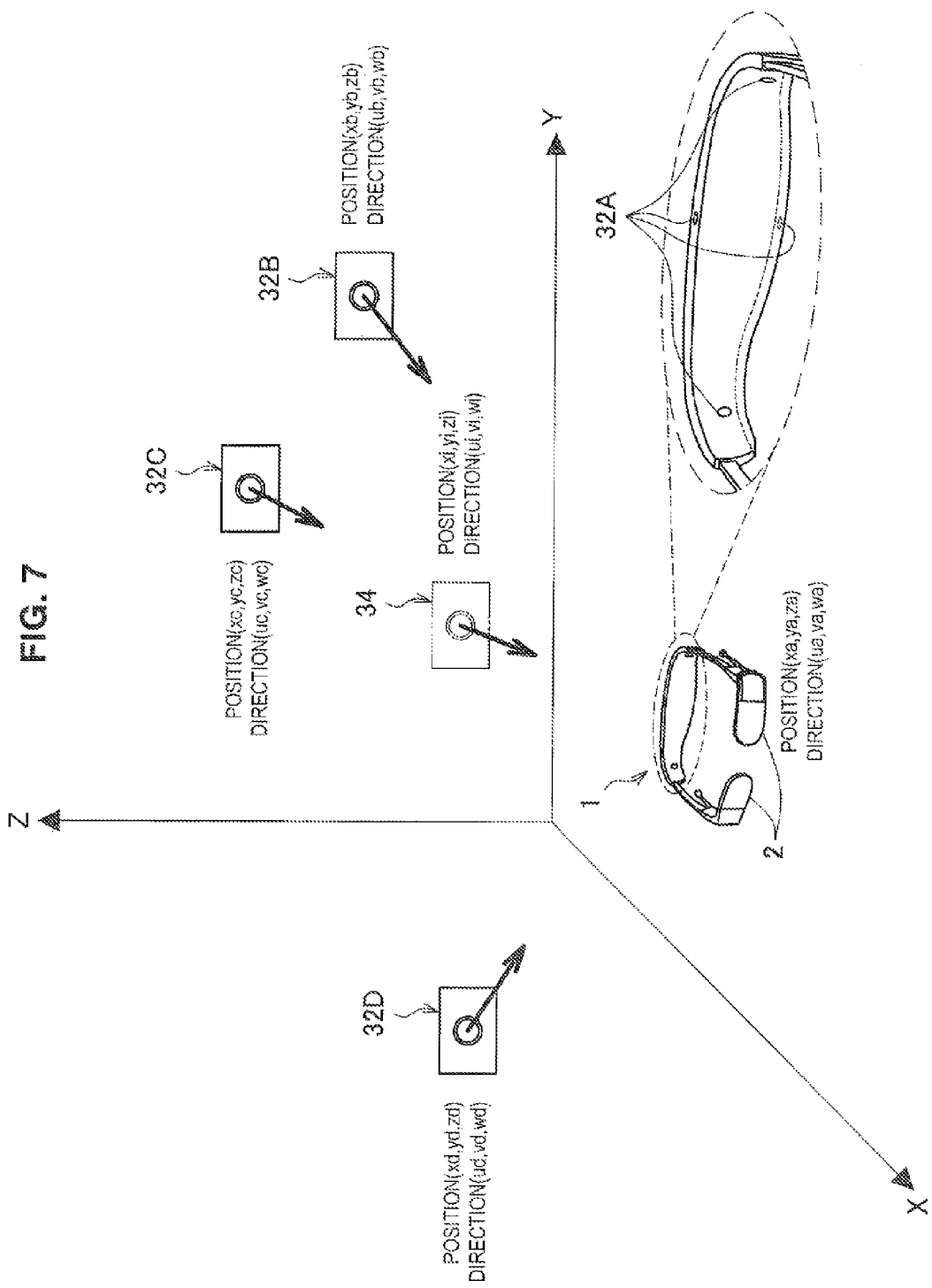

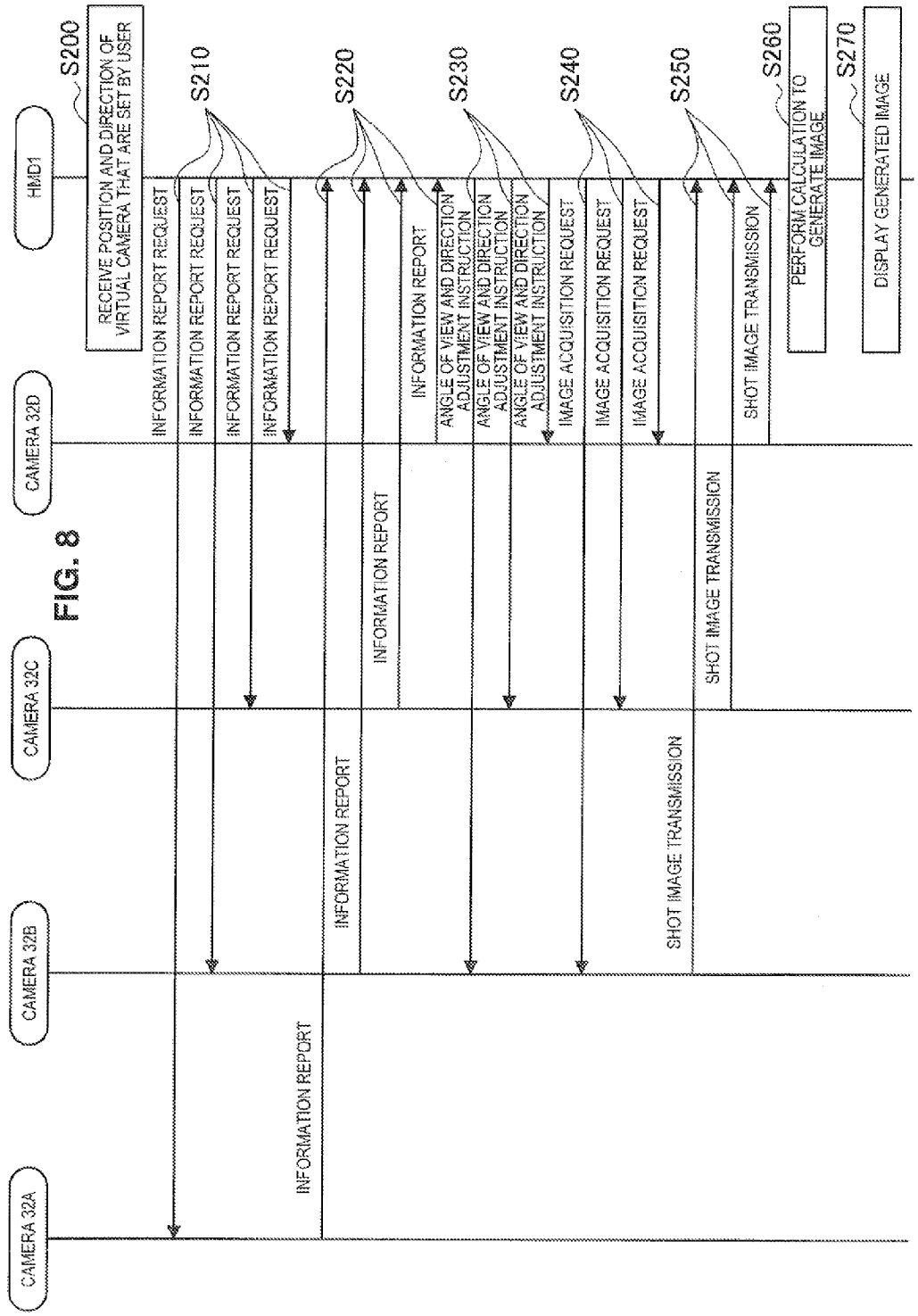

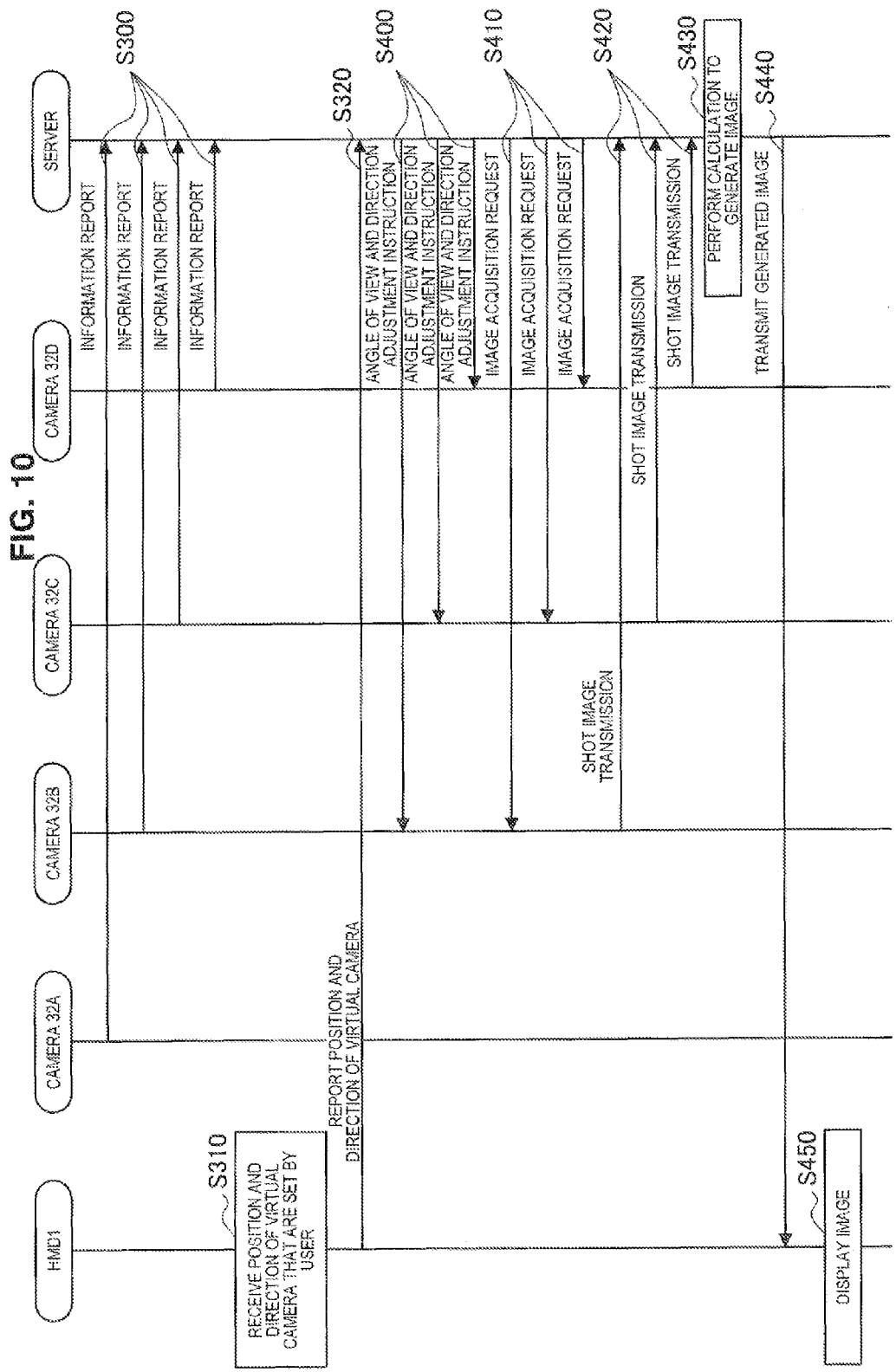

INFORMATION PROCESSING APPARATUS AND RECORDING MEDIUM

CROSS REFERENCE TO RELATED APPLICATIONS

This application claims the benefit of Japanese Priority Patent Application JP 2012-269270 filed Dec. 10, 2012, the entire contents of which are incorporated herein by reference.

BACKGROUND

The present disclosure relates to an information processing apparatus and a recording medium.

In recent years, there has been proposed a system in which an object called an avatar indicating a user is transmitted into a virtual space displayed in three-dimensional graphics, which is namely a three-dimensional virtual space, the avatar can walk around in the virtual space, and the avatar can also have a conversation (chat) with an avatar for another user. The virtual space displayed in three-dimensional graphics allows a user to feel more strongly as if the user were in the virtual space than two-dimensional graphics.

It is possible in the three-dimensional virtual space to cause an event to occur that is hardly conceivable in the real space, or an event to occur that occurs only in a fantasy world of a user. For example, JP H11-161812A proposes a technique for making a user feel as if the user were in a three-dimensional virtual world and floated outside the body, by switching a first person viewpoint (pilot avatar viewpoint) and a third person viewpoint in the virtual world.

SUMMARY

Although JP H11-161812A is certainly a technique for making a user feel as if the user floated outside the body in a virtual space, nothing is mentioned regarding making a user feel as if the user actually floated outside the body in the real world.

The present disclosure therefore proposes a novel and improved information processing apparatus and recording medium that can perform display control on an image from a third person viewpoint in the real world, from which a user is overlooked.

According to an embodiment of the present disclosure, there is provided an information processing apparatus including a display control unit configured to include a first display control mode in which control is performed in a manner that a first image from a user viewpoint, which is captured by a first imaging unit, is displayed on a display unit or control is performed in a manner that the display unit is transmissive, and a second display control mode in which control is performed in a manner that a second image captured by a second imaging unit including a user within an angle of view is displayed on the display unit, and a switching control unit configured to perform control in response to an instruction from the user in a manner that a display control mode of the display control unit is switched from the first display control mode to the second display control mode.

According to another embodiment of the present disclosure, there is provided a non-transitory computer-readable recording medium having a program recorded thereon, the program causing a computer to function as a display control unit configured to include a first display control mode in which control is performed in a manner that a first image from a user viewpoint, which is captured by a first imaging unit, is displayed on a display unit or control is performed in a manner that the display unit is transmissive, and a second display control mode in which control is performed in a manner that a second image captured by a second imaging unit including a user within an angle of view is displayed on the display unit, and a switching control unit configured to perform control in response to an instruction from the user in a manner that a display control mode of the display control unit is switched from the first display control mode to the second display control mode.

According to one or more of embodiments of the present disclosure, it becomes possible to perform display control on an image from a third person viewpoint in the real world, from which a user is overlooked.

BRIEF DESCRIPTION OF THE DRAWINGS

FIG. 7 is a diagram for describing a display control system with a virtual camera considered to be present therein;

FIG. 8 is a flowchart illustrating a display control process in a display control system with a virtual camera considered to be present therein;

FIG. 10 is a flowchart illustrating another display control process in a display control system including a server;

DETAILED DESCRIPTION OF THE EMBODIMENT(S)

Figure 1:
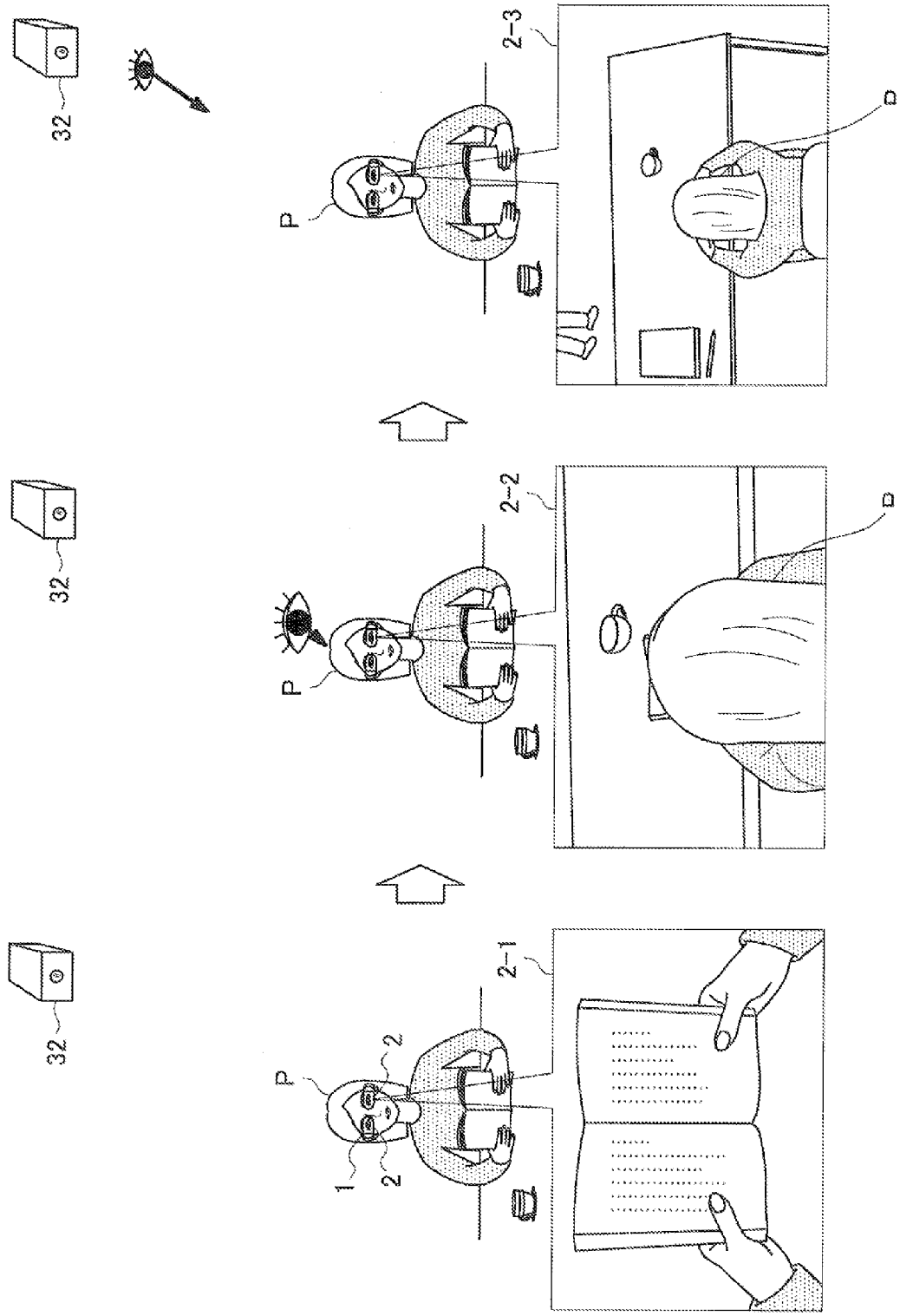
FIG. 1 is a diagram for describing an overview of a display control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.

1. Overview of Display Control System according to Embodiment of Present Disclosure
   2. Configuration and Operational Process of HMD
      2-1. Exterior of HMD
      2-2. Internal Configuration of HMD
      2-3. Display Control Process
      2-4. Supplement
   3. Other Embodiments
      3-1. Virtual Camera
      3-2. Control Process Performed by Server
      3-3. Another Device Example
   4. Conclusion <<1. Overview of Display Control System According to Embodiment of Present Disclosure>>

FIG. 1 is a diagram for describing an overview of a display control system according to an embodiment of the present disclosure. As illustrated in FIG. 1, the display control system according to the present embodiment includes a head mounted display (HMD) 1 and an external camera 32. The HMD 1 transmits and receives data to and from the external camera 32 through wireless communication such as Wi-Fi.

The HMD 1 is a glasses type wearable apparatus worn by a user P, as illustrated in FIG. 1. When the HMD 1 is worn, a pair of display units 2 for the right eye and the left eye is disposed immediately in front of both eyes of the user, at which the lenses of general glasses are namely positioned.

The display units 2 may be transmissive. The HMD 1 sets the display units 2 to be in a through-state, which is namely a transparent state or a semitransparent state. Accordingly, if the user P wears the HMD 1 all the time like general glasses, the HMD 1 does not interfere with the daily life.

Thus, when the display units 2 are controlled to be in a transmissive state, the user P can visually recognize a scene 2-1 from a user viewpoint (first person viewpoint) via the display units 2, as illustrated in the left of FIG. 1. Alternatively, the HMD 1 can substantially provide the scene 2-1 from a user viewpoint (first person viewpoint) as illustrated in the left of FIG. 1 by displaying, on the display units 2 in real time, a captured image that is captured by an imaging unit (first imaging unit) that is installed on the HMD 1 and configured to capture an image of an area in an eye-gaze direction of the user. In this way, transmittance control is performed on the display units 2, or control is performed such that a first captured image from a user view point, which is captured by the first imaging unit, is displayed. A mode in which a scene from a user viewpoint (first person viewpoint) is provided under such kinds of control is herein referred to as a first display control mode.

Here, JP H11-161812A certainly makes a user feel as if the user floated outside the body from a pilot avatar viewpoint, by switching a viewpoint to a third person viewpoint, from which the pilot avatar is visually recognized. However, JP H11-161812A only provides an artificial image (CG image) in a virtual space. To the contrary, a display control system according to an embodiment of the present disclosure can make a user feel as if the user actually floated outside the body in the real world.

Specifically, the HMD 1 according to the present embodiment displays, on the display units 2, a scene from a third person viewpoint (shot image) in the real world, from which the user P is overlooked, in response to a viewpoint switching instruction (out-of-body instruction) from the user P. Such a mode in which a scene from an out-of-body viewpoint (third person viewpoint) is displayed is herein referred to as a second display control mode.

For example, as illustrated in the center of FIG. 1 and the right of FIG. 1, the HMD 1 controls the display units 2 in response to an instruction from the user P to display, in real time, second captured images 2-2 and 2-3 that are captured by an external camera 32 (second imaging unit) including the user P within the angle of view. As illustrated in FIG. 1, the captured images 2-2 and 2-3 are video from a predetermined third person viewpoint including the user P within the angle of view. For example, the captured images 2-2 and 2-3 are acquired in response to an instruction from the HMD 1 or upon zoom control automatically performed by the external camera 32. In addition, the captured images 2-2 and 2-3 are sequentially displayed on the display units 2 of the HMD 1. Sequential display of the captured images 2-2 and 2-3 on the display units 2 in real time makes the user P feel as if the user P actually had an out-of-body experience and were floating into the sky in the real world.

As above, the overview of the display control system according to the present embodiment has been described. Next, with reference to FIGS. 2 to 4, a configuration and an operational process of the HMD 1 (information processing apparatus) included in the display control system according to the present embodiment will be described.

Additionally, the above-described external camera (second imaging unit) may also be a fixed security/surveillance camera installed in an indoor space or an outdoor space, or a camera mounted on a flying object (such as a small apparatus and an airship subjected to radio control). Especially in an environment where a vast number of cameras are disposed around the world, wherever the user P is, the HMD 1 can search for a camera disposed around the HMD 1 and acquire, in real time, an image (second captured image) obtained by capturing an image of the user P with the camera including the user P within the angle of view.

Furthermore, the external camera 32 (second imaging unit) may be a camera (periscopic camera) that is attached to a tip of an arm extending from the HMD 1, which is worn on the head of the user P and can capture an image of the user P within the angle of view.

<<2. Configuration and Operational Process of HMD>>

<2-1. Exterior of HMD>

Figure 2:
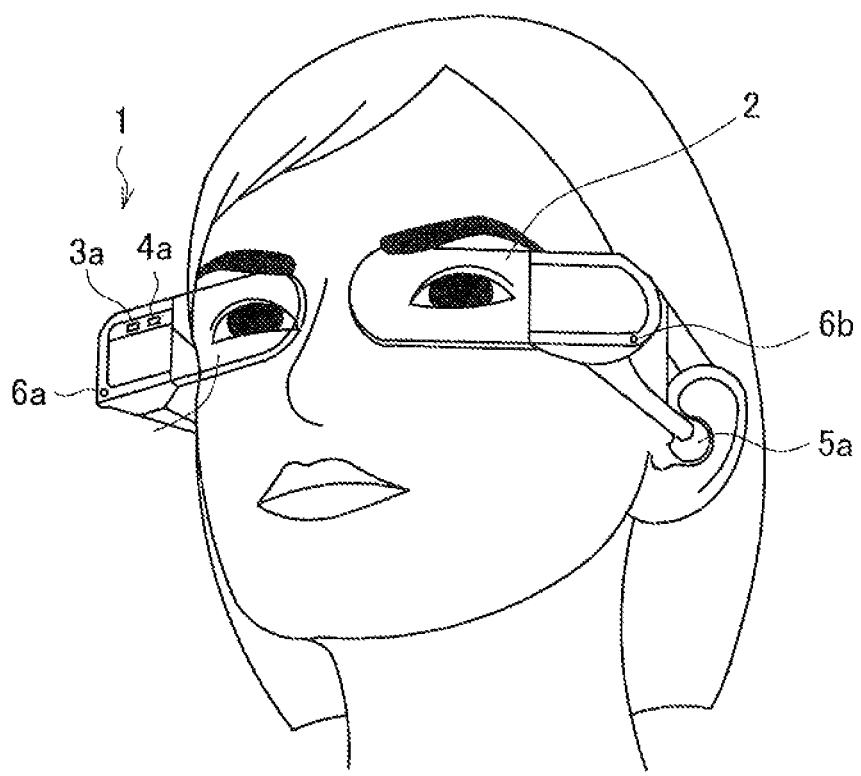
FIG. 2 is a block diagram illustrating an exterior of an HMD according to an embodiment of the present disclosure.

FIG. 2 is a diagram for describing an exterior of the HMD 1 according to the present embodiment. The glasses type HMD 1 illustrated in FIG. 2 is also referred to as a see-through HMD, and the display units 2 may be controlled to be in a transmissive state, as described above.

Specifically, the HMD 1 includes, for example, a wearable unit that is configured like a frame surrounding half of the head from both sides of the head to the back of the head. As illustrated in FIG. 2, a user wears the HMD 1 by hanging the HMD 1 at both pinnae.

When the HMD 1 is worn as illustrated in FIG. 2, a pair of display units 2 for the right eye and the left eye is disposed immediately in front of both eyes of the user, at which the lenses of general glasses are namely positioned. For example, a liquid crystal panel is used for the display units 2. The HMD 1 can control a transmittance of the liquid crystal panel such that the liquid crystal panel is in a through-state that is namely a transparent or semitransparent state (transmissive state or semi-transmissive state) as illustrated in FIG. 2. The display units 2 in a through-state do not interfere with a usual daily life if a user wears the HMD 1 all the time like glasses.

The display units 2 can also display a captured image obtained by capturing an image of the real space with an imaging lens 3a. The display units 2 can further reproduce and display content that is received from an external apparatus by the HMD 1 and content that is stored in a storage medium of the HMD 1. The external apparatus is an information processing apparatus such as a mobile phone terminal, a smartphone, a personal computer, and a server in addition to the external camera 32 illustrated in FIG. 1.

The content reproduced and displayed by the display units 2 may also be moving image content such as a movie and a video clip, and text data such as an electronic book in addition to the captured images 2-2 and 2-3 from a third person viewpoint including the user P within the angle of view, which are captured by the above-described external camera 32. The content may further include various kinds of data that is a display target such as computer use data which includes, for example, image data, text data, and spreadsheet data created by a user with a personal computer or the like, and a game image based on a game program.

When the user P wears the HMD 1 as illustrated in FIG. 2, the imaging lens 3a faces forward such that the an image of an area in a direction visually recognized by the user is captured as a subject direction. Furthermore, a light emitting unit 4a is installed that illuminates an area in an image-capturing direction of the imaging lens 3a. The light emitting unit 4a is made of a light emitting diode (LED), for example.

FIG. 2 illustrates only a single earphone speaker for the left ear, but a pair of earphone speakers 5a is installed that can be inserted into the right earhole and the left earhole of the user when the user wears the HMD 1.

Microphones 6a and 6b configured to collect external sounds are disposed at the right of the display units 2 for the right eye and at the left of the display units 2 for the left eye.

The exterior of the HMD 1 illustrated in FIG. 1 is just an example. Various configurations for a user to wear the HMD 1 are conceivable. The HMD 1 may be made of a wearable unit that is generally like glasses or wearable on the head. The display units 2 may be just disposed immediately in front of the eyes of a user at least in the present embodiment. Not only is the pair of display units 2 installed so as to correspond to both eyes, but just one of the display units 2 may also be installed so as to correspond to one eye.

Similarly, not only are the earphone speakers 5a installed as right and left stereo speakers, but just one of the earphone speakers 5a may also be installed so as to be inserted into one earhole. Only one of the microphones 6a and 6b may also be installed.

The microphones 6a and 6b, and the earphone speakers 5a may not be installed. Similarly, the light emitting unit 4a may not also be installed.

As above, the exterior of the HMD 1 according to the present embodiment has been described. Additionally, the present embodiment has described that display control is performed on the display units 2 of the glasses type HMD 1 worn by the user P, and that a scene from an out-of-body viewpoint (second captured image) is displayed on the HMD 1. However, the present embodiment is not limited to the HMD 1. For example, the display control system according to the present embodiment may perform control such that a scene from an out-of-body viewpoint (second captured image) is displayed on a display unit of a smartphone, a mobile phone terminal, a personal digital assistant (PDA), a personal computer (PC), a tablet terminal, a digital camera, a digital video camera, a portable music reproduction apparatus, a portable video processing apparatus, a portable game apparatus, or the like.

<2-2. Internal Configuration of HMD>

Figure 3:
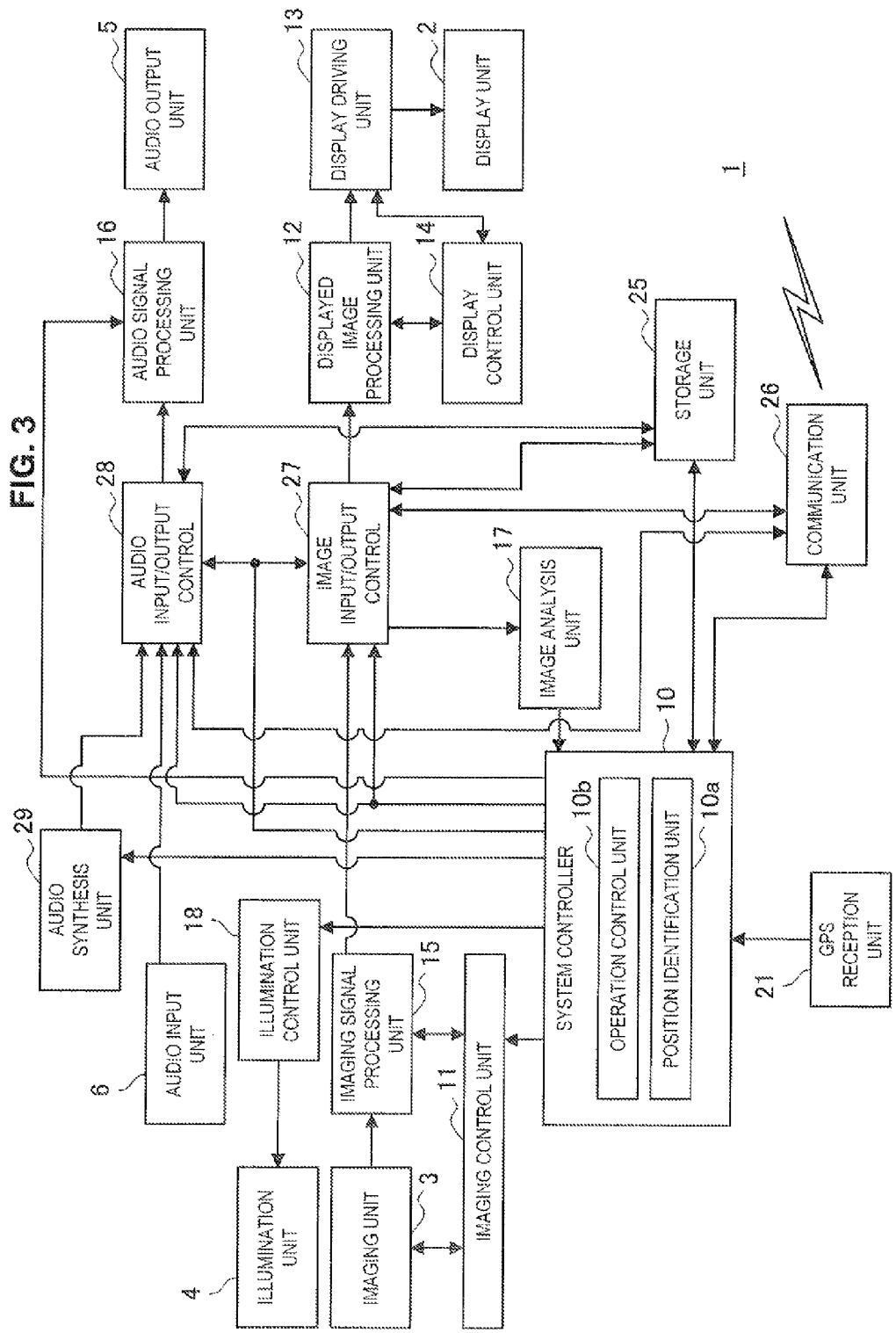
FIG. 3 is a block diagram illustrating an inner configuration example of an HMD according to an embodiment of the present disclosure.

Next, with reference to FIG. 3, an internal configuration example of the HMD 1 according to the present embodiment will be described. FIG. 3 is a block diagram illustrating the internal configuration example of the HMD 1 illustrated in FIG. 2.

As illustrated in FIG. 3, the HMD 1 includes a display unit 2, a imaging unit 3, an illumination unit 4, an audio output unit 5, an audio input unit 6, a system controller 10, an imaging control unit 11, a displayed image processing unit 12, a display driving unit 13, a display control unit 14, an imaging signal processing unit 15, an audio signal processing unit 16, an image analysis unit 17, an illumination control unit 18, a GPS reception unit 21, a storage unit 25, a communication unit 26, an image input/output control 27, an audio input/output control 28, and an audio synthesis unit 29.

(System Controller)

The system controller 10 includes a microcomputer equipped with, for example, a central processing unit (CPU), read only memory (ROM), random access memory (RAM), a non-volatile memory, and an interface unit. The system controller 10 controls structural elements of the HMD 1.

The system controller 10 also functions as a position identification unit 10a configured to identify a position of the HMD 1, and an operation control unit 10b configured to control operations of the HMD 1, as illustrated in FIG. 2.

The position identification unit 10a identifies a current position (current place) of the HMD 1 on the basis of data that is output from the GPS reception unit 21, the image analysis unit 17, or the audio signal processing unit 16. Specifically, for example, the position identification unit 10a identifies, as a current position, current position information (such as latitude and longitude) that is received from the GPS reception unit 21 in real time. The position identification unit 10a may also identify, as a current position, a captured image that is captured by the imaging unit 3 and analyzed by the image analysis unit 17 in real time. The position identification unit 10a may also identify, as a current position, a name represented by a sound that is collected by the audio input unit 6 and processed by the audio signal processing unit 16 in real time. Additionally, the name includes, for example, an address, a place name, a facility name (including a park name), or a building name.

The operation control unit 10b controls each operation of the HMD 1. More specifically, the operation control unit 10b according to the present embodiment functions as a switching control unit configured to perform control in response to a switching instruction from an user for switching a viewpoint to an out-of-body viewpoint such that display control modes of the display control unit 14 are switched from a first display control mode to a second display control mode. As described above, a scene from a first person viewpoint is provided to the user P in the first display control mode while a captured image of the user P from an out-of-body viewpoint, which is namely a third person viewpoint, is provided in real time to the user P in the second display control mode.

The operation control unit 10b (switching control unit) can receive an switching instruction from a user for switching a viewpoint to an out-of-body viewpoint through a button/switch operation input, an eye-gaze input, an audio input, a gesture input, a myoelectric input, or a brain wave input.

The button/switch operation input is an operation input via a physical button/switch (not shown) installed on the HMD 1. The user P pushes down the button/switch for issuing an instruction for switching a viewpoint to an out-of-body viewpoint, thereby issuing the instruction.

The eye-gaze input is a way of inputting an instruction, which is detected on the basis of an image captured by an imaging lens (not shown) that is installed inward in the HMD 1 so as to shoot an image of an eye of the user P. The operation control unit 10b tracks movement of the pupil of the eye of the user P whose image has been captured, and calculates an orientation of the eye-gaze. The operation control unit 10b can hereby identify where the user gazes (eye-gaze direction). The user P can issue an instruction for switching a viewpoint to an out-of-body viewpoint by gazing in a predetermined direction for a predetermined time and blinking predetermined times.

The audio input is a way of inputting an instruction, which may be detected by the audio input unit 6 collecting a sound and the audio signal processing unit 16 recognizing the sound. For example, the user P can issue an instruction for switching a viewpoint to an out-of-body viewpoint by saying "outside the body" or the like.

The gesture input is a way of inputting an instruction, which may be recognized in the image analysis unit 17 by the imaging lens 3a shooting an image of a gesture made by a hand of the user P. Additionally, the gesture input may also be a way of inputting an instruction through the movement of the head of the user P, which may be detected by an acceleration sensor or a gyro sensor installed in the HMD 1.

The myoelectric input is a way of inputting an instruction, which is detected on the basis of a result obtained by a myoelectric sensor (not shown) installed in the HMD 1 measuring a change in myoelectricity generated when the user P opens and closes the left eye, the right eye, or both eyes like winking. For example, the user P can issue an instruction for switching a viewpoint to an out-of body viewpoint by winking the left eye, can introduce the out-of-body viewpoint to a higher position such as overlooking the user P from the sky by winking the right eye, and can return the out-of-body viewpoint to the original viewpoint (first person viewpoint) by closing both eyes.

Furthermore, the brain wave input is a way of inputting an instruction, which is detected on the basis of a result obtained by a brain wave sensor (not shown) installed in the HMD 1 measuring a change in brain waves generated when the user P relaxes or concentrates. For example, the user P can issue an instruction for switching a viewpoint to an out-of-body viewpoint by imagining that the user P were floating outside the body, and concentrating.

(Imaging Unit)

The imaging unit 3 includes, for example, a lens system including an imaging lens 3a, a diaphragm, a zoom lens, and a focus lens, a driving system configured to cause a focus operation or a zoom operation to the lens system, and a solid-state image sensor array configured to generate an imaging signal by performing photoelectric conversion on imaging light acquired by the lens system. The solid-state image sensor array may be realized, for example, by a charge coupled device (CCD) sensor array and a complementary metal oxide semiconductor (CMOS) sensor array.

A captured image is captured by the imaging lens 3a that faces forward so as to shoot an image of an area in a direction visually recognized by the user P as a subject direction, as illustrated in FIG. 2. Such a captured image is a first captured image from a user viewpoint (first person viewpoint). The imaging unit 3, which can capture such a first captured image from a user viewpoint, is an example of the first imaging unit according to an embodiment of the present disclosure.

(Imaging Signal Processing Unit)

The imaging signal processing unit 15 includes a sample hold/automatic gain control (AGC) circuit configured to perform gain control or waveform shaping on a signal acquired by the solid-state image sensor of the imaging unit 3, or a video analog/digital (A/D) converter. The imaging signal processing unit 15 hereby acquires an imaging signal as digital data. The imaging signal processing unit 15 also performs a white balance process, a luminance process, a color signal processing, and a shake correction process on the imaging signal, for example.

(Imaging Control Unit)

The imaging control unit 11 controls operations of the imaging unit 3 and the imaging signal processing unit 15 on the basis of an instruction from the system controller 10. For example, the imaging control unit 11 controls the operations of the imaging unit 3 and the imaging signal processing unit 15 to be turned on/off. The imaging control unit 11 is also configured to perform control (motor control) on the imaging unit 3 to perform an operation such as an autofocus operation, automatic exposure adjustment, diaphragmatic adjustment, and a zoom operation. The imaging control unit 11 includes a timing generator, and controls signal processing operations of the solid-state image sensor, and the sample hold/AGC circuit and the video A/D converter of the imaging signal processing unit 15 with timing signals generated by the timing generator. Such timing control allows variable control on an imaging frame rate.

The imaging control unit 11 further controls imaging sensitivity and signal processing in the solid-state image sensor and the imaging signal processing unit 15. For example, the imaging control unit 11 can perform gain control as imaging sensitivity control on a signal that is read out from the solid-state image sensor, black level setting control, various kinds of coefficient control in a process for an imaging signal as digital data, correction level control in a shake correction process, or the like. With respect to the imaging sensitivity, whole sensitivity adjustment with a wavelength bandwidth given no particular consideration, or sensitivity adjustment (such as imaging by cutting a specific wavelength bandwidth) for adjusting imaging sensitivity of specific wavelength bandwidths such as an infrared range and an ultraviolet range can also be performed. A wavelength filter is inserted in the imaging lens system, or a wavelength filter operation process is performed on an imaging signal, thereby allowing sensitivity adjustment according to a wavelength. In such cases, the imaging control unit 11 can perform sensitivity control by performing insertion control on a wavelength filter, designating a filter operation coefficient, or the like.

(Image Input/Output Control)

The image input/output control 27 is supplied with an imaging signal (image data obtained by capturing an image) that is obtained by the above-described imaging unit 3 capturing an image and processed by the imaging signal processing unit 15. The image input/output control 27 controls transfer of the image data in accordance with control performed by the system controller 10. That is, the image input/output control 27 controls transfer of the image data among an imaging system (imaging signal processing unit 15), a display system (displayed image processing unit 12), the storage unit 25, and the communication unit 26.

For example, the image input/output control 27 performs an operation of supplying the displayed image processing unit 12, the storage unit 25, or the communication unit 26 with the image data that is an imaging signal processed in the imaging signal processing unit 15. The image input/output control 27 further performs an operation of supplying the displayed image processing unit 12 or the communication unit 26 with image data reproduced by the storage unit 25, for example. The image input/output control 27 also performs an operation of supplying the displayed image processing unit 12 or the storage unit 25 with image data (such as a second captured image received from the external camera 32) received by the communication unit 26, for example.

(Displayed Image Processing Unit)

The displayed image processing unit 12 is, for example, a so-called video processor, which is namely a portion that can perform various display processes on the supplied image data. For example, the displayed image processing unit 12 can perform luminance level adjustment, color correction, contrast adjustment, sharpness (contour emphasis) adjustment on the image data.

(Display Driving Unit)

The display driving unit 13 includes a pixel driving circuit for displaying the image data supplied from the displayed image processing unit 12 on the display units 2, which is, for example, made of a liquid crystal display. That is, driving signals based on video signals are applied to pixels disposed on the display units 2 in a matrix at predetermined horizontal/vertical driving timing, and each pixel is displayed. The display driving unit 13 can also bring the display units 2 into a through-state by controlling a transmittance of each pixel on the display units 2 in accordance with an instruction of the display control unit 14.

(Display Control Unit)

The display control unit 14 controls a processing operation of the displayed image processing unit 12 and an operation of the display driving unit 13 in accordance with control performed by the system controller 10. Specifically, the display control unit 14 controls the displayed image processing unit 12 to perform luminance level adjustment or the like on image data, which has been described above.

The display control unit 14 according to the present embodiment has a first display control mode and a second display control mode, and switches the display control modes in accordance with control performed by the operation control unit 10b (switching control unit) in the system controller 10. The first display control mode performs control such that the display units 2 display a first captured image from a user viewpoint, which is captured by the imaging unit 3 (first imaging unit), or performs control such that the display units 2 are transmissive. The display control unit 14 can hereby provide a scene from a user viewpoint (first person viewpoint) to the user P.

Control is performed in the he second display control mode such that the display units 2 display a second captured image captured by the external camera 32 (second imaging unit) including the user P within the angle of view. The display control unit 14 can hereby provide a scene from an out-of-body viewpoint (third person viewpoint) to the user P. The second captured image captured by the above-described external camera (second imaging unit) is also acquired from the external camera 32 via the communication unit 26 in real time.

(Audio Input Unit)

The audio input unit 6 includes the microphones 6a and 6b illustrated in FIG. 2, a microphone/amplifier unit configured to perform an amplification process on audio signals acquired from the microphones 6a and 6b, and an A/D converter. The audio input unit 6 outputs audio data to the audio input/output control 28.

(Audio Input/Output Control)

The audio input/output control 28 controls transfer of audio data in accordance with control performed by the system controller 10. Specifically, the audio input/output control 28 controls transfer of audio signals among the audio input unit 6, audio signal processing unit 16, the storage unit 25, and the communication unit 26. For example, the audio input/output control 28 performs an operation of supplying the audio signal processing unit 16, the storage unit 25, or the communication unit 26 with the audio data acquired by the audio input unit 6.

The audio input/output control 28 also performs an operation of supplying the audio signal processing unit 16 or the communication unit 26 with the audio data reproduced by the storage unit 25, for example. The audio input/output control 28 further performs an operation of supplying the audio signal processing unit 16 or the storage unit 25 with the audio data received by the communication unit 26, for example.

More specifically, the audio input/output control 28 according to the present embodiment functions as an audio output control unit configured to perform control such that a predetermined sound effect is output when the operation control unit 10b (switching control unit) performs switching control on the display control modes. For example, if the audio input/output control 28 (audio output control unit) outputs a predetermined sound effect that cause an out-of-body experience to occur to the user P, the user P can undergo an out-of-body experience not only visually but also aurally.

(Audio Signal Processing Unit)

The audio signal processing unit 16 includes, for example, a digital signal processor and a D/A converter. The audio signal processing unit 16 is supplied via the audio input/output control 28 with the audio data acquired by the audio input unit 6, or the audio data acquired from the storage unit 25 or the communication unit 26. The audio signal processing unit 16 performs, for example, a process for sound volume adjustment, sound quality adjustment, or a sound effect on the supplied audio data in accordance with control performed by the system controller 10. The processed audio data is converted into an analog signal, and supplied to the audio output unit 5. Additionally, the audio signal processing unit 16 is not limited to a structural element configured to perform digital signal processing, but may also be a structural element configured to perform signal processing by use of an analog amplifier or an analog filter.

(Audio Output Unit)

The audio output unit 5 includes the pair of earphone speakers 5a illustrated in FIG. 2 and an amplifier circuit for the earphone speakers 5a. The audio output unit 5 may also be configured as a so-called bone conduction speaker. Furthermore, a user can listen to an external sound, a sound reproduced by the storage unit 25, and a sound received by the communication unit 26 via the audio output unit 5.

(Storage Unit)

The storage unit 25 records data onto a predetermined recording medium, and reproduces the data in the predetermined recording medium. The storage unit 25 is realized, for example, by a hard disk drive (HDD). Naturally, a solid-state memory such as flash memory, a memory card having the solid-state memory built therein, an optical disc, a magneto-optical disk, and a hologram memory is conceivable as a recording medium, for example. The storage unit 25 may be just configured so as to perform recording and reproduction operations in accordance with a recording medium to be adopted.

The storage unit 25 is supplied via the image input/output control 27 with image data that is an imaging signal whose image is captured by the imaging unit 3 and processed by the imaging signal processing unit 15, or image data that is received by the communication unit 26. The storage unit 25 is also supplied via the audio input/output control 28 with audio data that is acquired by the audio input unit 6, or audio data that is received by the communication unit 26.

The storage unit 25 performs an encoding process on the supplied image data and audio data in order to record them onto a recording medium in accordance with control performed by the system controller 10, thereby recording the image data and the audio data onto a recording medium. The storage unit 25 also reproduces the image data and the audio data from the recording medium in accordance with control performed by the system controller 10. The image data reproduced by the storage unit 25 is output to the image input/output control 27. Meanwhile, the audio data reproduced by the storage unit 25 is output to the audio input/output control 28.

(Communication Unit)

The communication unit 26 transmits and receives data to and from an external apparatus. The communication unit 26 is an example of a structural element for acquiring external information. The communication unit 26 wirelessly communicates with the external apparatus directly or via a network access point in a scheme such as a wireless LAN, Wi-Fi, infrared communication, and Bluetooth.

Various apparatuses such as a computer apparatus, a PDA, a mobile phone terminal, a smartphone, a video apparatus, an audio apparatus, and a tuner apparatus that have information processing and communication functions are conceivable as the external apparatuses in addition to the above-described external camera 32. For example, a terminal apparatus and a server apparatus that are connected to a network such as the Internet are also conceivable as the external apparatuses that are communication targets. For example, a contactless communication IC card having an IC chip built therein, a two-dimensional barcode such as QR code (registered trademark), and a hologram memory may be further regarded as the external apparatuses, and the communication unit 26 may also be configured to read information from such external apparatuses. Moreover, another HMD 1 is conceivable as the external apparatus.

The communication unit 26 is supplied via the image input/output control 27 with the image data that is the imaging signal whose image is captured by the imaging unit 3 and processed by the imaging single processing unit 15, and the image data that is reproduced by the storage unit 25. Meanwhile, the communication unit 26 is supplied via the audio input/output control 28 with the audio data that is acquired by the audio input unit 6, and the audio data that is reproduced by the storage unit 25.

The communication unit 26 performs an encoding process, a modulation process, and the like for transmission on the supplied image data and audio data in accordance with control performed by the system controller 10, thereby transmitting the image data and the audio data to the external apparatus. The communication unit 26 according to the present embodiment transmits, for example, an information report request or an angle of view/direction adjustment instruction to a nearby external camera 32. The communication unit 26 performs an operation of receiving data from the external apparatus, which is, for example, an operation of receiving a captured image from the external camera 32. The image data that is received and demodulated is output to the image input/output control 27. Meanwhile, the audio data that is received and demodulated is output to the audio input/output control 28.

(Audio Synthesis Unit)

The audio synthesis unit 29 performs audio synthesis in accordance with control performed by the system controller 10, and outputs an audio signal. The audio signal that is output from the audio synthesis unit 29 is supplied to the audio signal processing unit 16 via the audio input/output control 28 and processed by the audio signal processing unit 16. Thereafter, the processed audio signal is further supplied to the audio output unit 5, and the sound is output to a user.

(Illumination Unit and Illumination Control Unit)

The illumination unit 4 includes the light emitting unit 4a illustrated in FIG. 2, and a light emitting circuit for causing the light emitting unit 4a (such as an LED) to emit light. The illumination control unit 18 causes the illumination unit 4 to perform a light emitting operation, in accordance with control performed by the system controller 10. The light emitting unit 4a of the illumination unit 4 is attached so as to illuminate a front area, as illustrated in FIG. 2. The illumination unit 4 hereby performs an illumination operation in a visual field direction of a user.

(GPS Reception Unit)

The GPS reception unit 21 is an example of a structural element for acquiring external information. Specifically, the GPS reception unit 21 receives radio waves from a global positioning system (GPS) satellite, and outputs information regarding latitude and longitude for a current position.

(Image Analysis Unit)

The image analysis unit 17 is an example of a structural element for acquiring external information. Specifically, the image analysis unit 17 analyzes image data, and acquires information regarding the image included in the image data. The image analysis unit 17 is supplied via the image input/output control 27 with image data. The image data whose image is analyzed by the image analysis unit 17 is image data of a captured image acquired by the imaging unit 3 and the imaging signal processing unit 15, image data received by the communication unit 26, or image data reproduced from a recording medium by the storage unit 25.

As above, the internal configuration of the HMD 1 according to the present embodiment has been described in detail. Additionally, the GPS reception unit 21, the image analysis unit 17, and the communication unit 26 have been shown as structural elements for acquiring external information. However, not all of them have to be included. Another sensor such as an audio analysis unit configured to detect and analyze a nearby sound may also be installed.

<2-3. Display Control Process>

Figure 4:
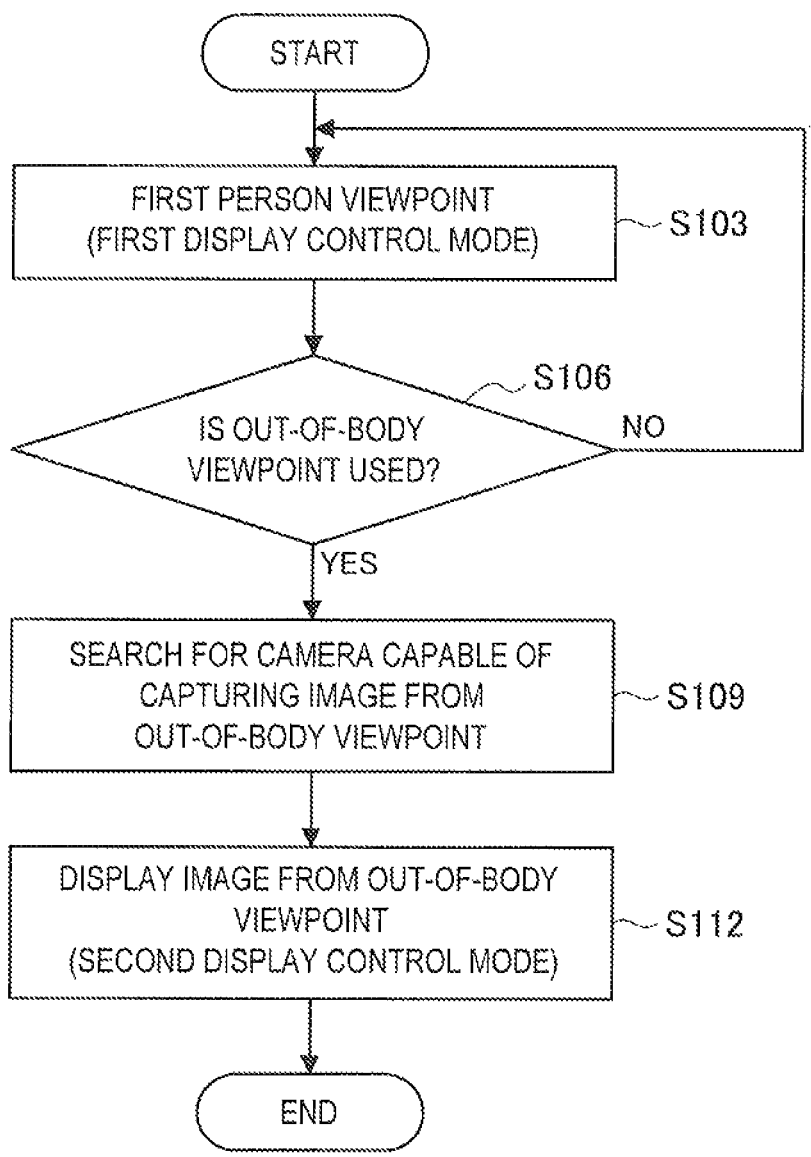
FIG. 4 is a flowchart illustrating a display control process according to an embodiment of the present disclosure.

Next, with reference to FIG. 4, a display control process performed by the HMD 1 according to the present embodiment will be specifically described.

FIG. 4 is a flowchart illustrating a display control process according to the present embodiment. First of all, as shown in step S103 of FIG. 4, the display control unit 14 of the HMD 1 provides a scene from a first person viewpoint to the user P as the first display control mode.

Specifically, control is performed such that the display units are transmissive, or control is performed such that the display units 2 display a captured image which is captured by the imaging unit 3 with the imaging lens 3a (see FIG. 2) configured to capture an image of an area in a direction visually recognized by the user P. As illustrated in the left of FIG. 1, the scene 2-1 from a user view point (first person viewpoint) can hereby be visually recognized.

Next, in step S106, the HMD 1 determines whether the user P issues an instruction for switching a viewpoint to an out-of-body viewpoint.

Subsequently, if the out-of-body instruction is issued (S106/Yes), the HMD 1 searches for, in step S109, an external camera 322 capable of capturing an image from an out-of-body viewpoint including the user P within the angle of view. Specifically, for example, the HMD 1 transmits an information report request to one or more nearby external cameras 32 through near field communication, and acquires position information, angle of view information, and image-shooting direction information of each camera. The HMD 1 selects an external camera 32 including the user P within the angle of view, who wears the HMD 1, on the basis of the acquired information and a current position of the HMD 1 (such as position information acquired by the GPS reception unit 21), and acquires a captured image from the external camera 32.

Alternatively, the HMD 1 may also acquire captured images from the one or more nearby external cameras 32, analyze each captured image, and automatically select a captured image that widely includes the user P within the angle of view. Alternatively, the HMD 1 may also present the captured images acquired from the nearby external cameras 32 to the display units 2, and cause the user P to manually select a captured image.

Next, in step S112, the operation control unit 10*b* (switching control unit) of the HMD 1 performs control so as to switch the display control mode of the display control unit 14 to the second display control mode. The display control unit 14 can hereby provide a scene from an out-of-body viewpoint (third person viewpoint) including the user P within the angle of view to the user P as the second display control mode. The user P can feel as if the user P floated outside the body in the real world.

Specifically, the display control unit 14 displays, on the display units 2 in real time, a captured image (or a automatically/manually selected captured image) received from the external camera 32 that is searched for in S109, as a scene from an out-of-body viewpoint (third person viewpoint). For example, as illustrated in the center of FIG. 1, the captured image 2-2 captured by the external camera 32 is displayed on the display units 2 as a scene from an out-of-body viewpoint (third person viewpoint). When the display control unit 14 switches the display control mode to the second display control mode, the display control unit 14 may generate a transition image indicating that the display control modes are being switched, on the basis of the images before and after switching the display control modes (first and second images from a user viewpoint, which are captured by the first imaging unit), and display the transition image on the display units 2.

After the display control unit 14 displays the captured image 2-2 on the display units 2, the display control unit 14 may transmit a zoom instruction to the external camera and display the captured image 2-3 from a third person viewpoint, which is zoomed out, as illustrated in the right of FIG. 1 on the display units 2 in real time. The user P can hereby feel as if the user P floated higher in the sky.

As above, the display control process according to the present embodiment has been described in detail. Additionally, as illustrated in FIG. 1, when the captured images 2-2 and 2-3 are sequentially displayed, the user P can certainly feel as if the user P floated higher in the sky. However, the wider the angle of view becomes, the smaller the user P becomes and the more difficult it becomes to visually recognize the user P. Accordingly, a position of the user P can be explicitly indicated in the present embodiment by superimposing an indicator indicating the position of the use P on the second captured image. Next, with reference to FIG. 5, the specific description will be made.

Figure 5:
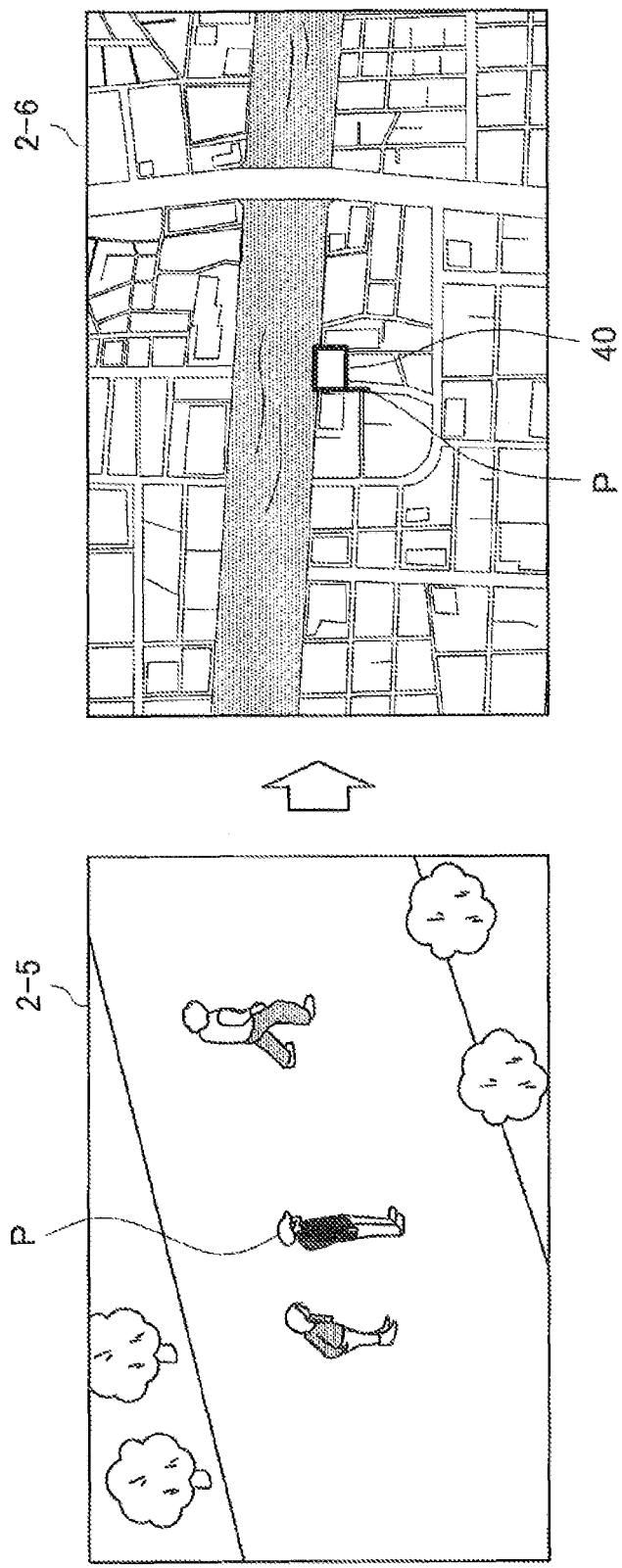
FIG. 5 is a diagram for describing that an indicator indicating a position of a user is superimposed on a second captured image.

FIG. 5 is a diagram for describing that an indicator indicating a position of the user P is superimposed on the second captured image. As illustrated in FIG. 5, for example, when the display control unit 14 of the HMD 1 displays a captured image 2-5 on the display units 2 in the second display control mode, no indicator is displayed because the user P is displayed on the captured image 2-5 in a visually recognizable way. It may be determined whether the user P is displayed on the captured image 2-5 in a visually recognizable way, on the basis of an analysis result of the image analysis unit 17. Alternatively, it may be determined that the user P is displayed in a visually recognizable way when the user does not issue an indicator display instruction.

To the contrary, when the angle of view for capturing a captured image from an out-of-body viewpoint, which is displayed on the display units 2, is widened, a captured image 2-6 may be displayed that is captured by an external camera 32 mounted, for example, on a skyscraper or an airship. In this case, since the user P is not be recognizable in the captured image 2-6 as illustrated in FIG. 5, the display control unit 14 superimposes an indicator 40 indicating a position of the user P. It may be determined whether the user P is recognizable, on the basis of an analysis result of the image analysis unit 17, as described above. Alternatively, it may be determined that the user P is not recognizable, when the user issues an indicator display instruction.

Additionally, a position (displayed position of the indicator 40) of the user P in the captured image 2-6 may be determined on the basis of, for example, position information of the HMD 1, or position information, altitude information or angle of view information of the external camera 32 that captures the captured image 2-6, or an analysis result of the image analysis unit 17.

The indicator 40 hereby allows the user P to recognize a position of the user P in the captured image 2-6 from an out-of-body viewpoint (third person viewpoint), which is displayed on the display units 2, even if the user P is not recognizable in the captured image 2-6.

<2-4. Supplement>

Next, the display control system according to the present embodiment will be supplemented. The user P feels as if the user P floated outside the body in the real world in the above-described embodiment. The HMD 1 may further perform control such that it is explicitly indicated to nearby people that the user P is undergoing an out-of-body experience.

Figure 6A:
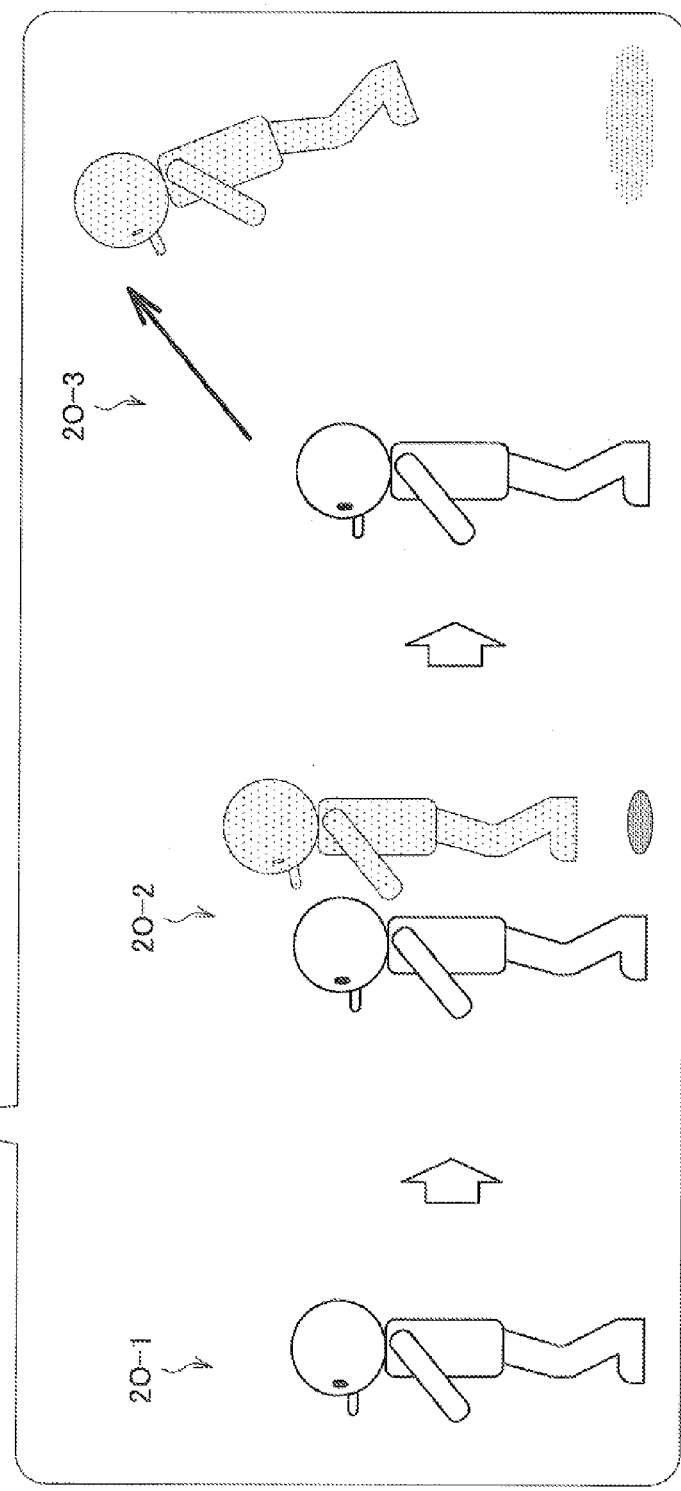
FIG. 6A is a diagram illustrating an example of an image that is displayed on an outer display unit according to the present embodiment and indicates that a user is undergoing an out-of-body experience.
Figure 6B:
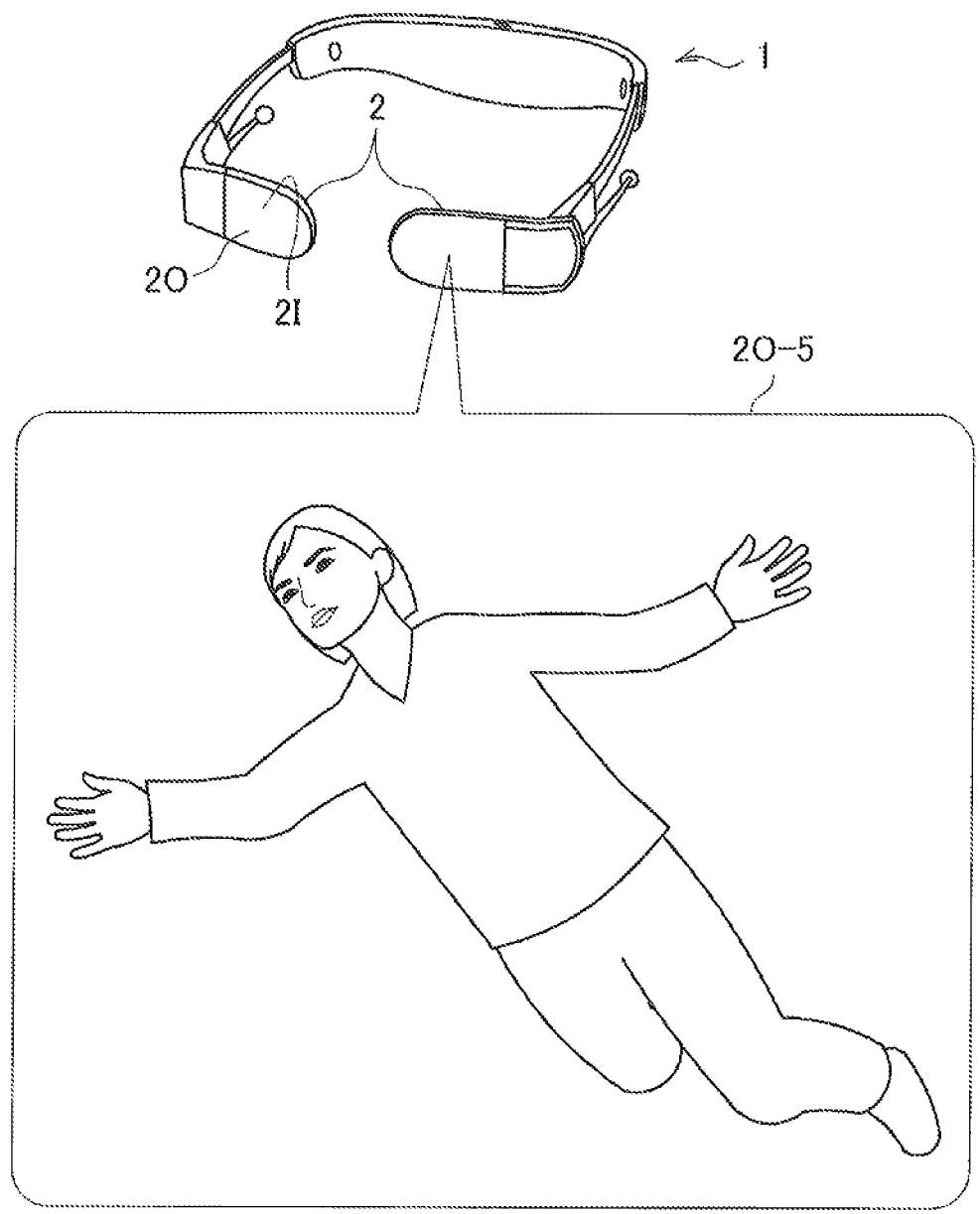
FIG. 6B is a diagram illustrating an example of an image that is displayed on an outer display unit according to the present embodiment and indicates that a user is undergoing an out-of-body experience.

For example, the HMD 1 explicitly indicates to nearby people that the user P is undergoing an out-of-body experience (the second display control mode is in use), by flashing the light emitting unit 4*a* or displaying a predetermined image on the display units installed outward on a side or back of the HMD 1. With reference to FIGS. 6A and 6B, it will be specifically described below that a predetermined image is displayed on a display unit installed on the outside in order to explicitly indicate to nearby people that the user P is undergoing an out-of-body experience.

FIGS. 6A and 6B are each a diagram illustrating an image example displayed on an outer display unit. Here, as illustrated in FIG. 6A, let us assume that the display units 2 of the HMD 1 are made of a double-sided display including an inner display unit 2I configured to face a wearer (inner) and an outer display unit 2O configured to face an opposite side (outer) to the inner display unit 2I. In this case, the display control unit 14 displays a captured image from an out-of-body viewpoint (third person viewpoint) on the inner display unit 2I, and a predetermined image indicating the user P is undergoing an out-of-body experience on the outer display unit 2O in the second display control mode.

The predetermined image displayed on the outer display unit 2O may also be an iconized transition image indicating an out-of-body situation as illustrated in FIG. 6A. Specifically, as illustrated in FIG. 6A, the outer display unit 2O sequentially displays an image 2O-1 indicating an iconized person, an image 2O-2 indicating that the iconized person starts to float outside the body, and an image 2O-3 indicating that the iconized person is floating outside the body. Alternatively, the predetermined image displayed on the outer display unit 2O may also be an image 2O-5 that is generated by use of an image of the user P as illustrated in FIG. 6B and indicates a situation in which the user P is floating.

In this way, it is possible to explicitly indicate to nearby people that the user P is undergoing an out-of-body experience, by displaying a predetermined image indicating that the user is undergoing an out-of-body experience on the outer display unit 2O of the display units 2.

As above, the configuration and the display control process of the HMD 1 included in the display control system according to the present embodiment have been described in detail. However, what has been described above is just an example of the display control system according to an embodiment of the present disclosure. The present technology is not limited to the above-described embodiment. A display control system according to other embodiments of the present disclosure will be described below.

<<3. Other Embodiments>>

<3-1. Virtual Camera>

An image from a third person viewpoint, which includes the user P within the angle of view, is acquired from the external camera 32 in the above-described embodiment. However, the display control system according to an embodiment of the present disclosure is not limited thereto. A virtual external camera (which will be referred to as a virtual camera) may also be used. The HMD 1 controls a position or an image-capturing direction of the virtual camera, generates an image considered to be captured by the virtual camera, on the basis of the captured images acquired from multiple external cameras 32 and displayed the image on the display units 2. Next, with reference to FIGS. 7 and 8, a display control system that uses such a virtual camera will be specifically described.

(Overview)

FIG. 7 is a diagram for describing a display control system that uses a virtual camera. As illustrated in FIG. 7, the HMD 1 can be connect to nearby external cameras 32A to 32D, and transmit and receive data thereto and therefrom. The external cameras 32A to 32D each include position information and image-shooting direction information.

Here, the external cameras 32A are second imaging units installed in the back of the HMD 1 (corresponding to the back of a user's head when the user wears the HMD 1), as illustrated in FIG. 7. The external cameras 32A are realized by multiple super-wide angle lenses that capture images of areas in upper, lower, and inward directions of the HMD 1, as illustrated in FIG. 7. Images of the back of the head, a side of the head, and the back (body) of a wearer are captured by the super-wide angle lenses. The external cameras 32A can combine the multiple captured images captured with the multiple super-wide angle lenses to generate an image from a third person viewpoint, which includes the back of the head of the wearer (user P) within the angle of view.

The HMD 1 also controls a position and an image-shooting direction of the virtual camera 34 in accordance with a user operation, and generates an image considered to be captured by the virtual camera 34. Specifically, necessary captured images are acquired from the external cameras 32A to 32D installed around the HMD 1 with reference to positions/image-shooting directions of the external cameras 32A to 32D. The acquired captured images are used to generate an image considered to be captured by the virtual camera 34. In this way, the HMD 1 can generates an out-of-body image from a free viewpoint according to an user operation by use of the captured images acquired from the external cameras 32A to 32D, and display the generated image on the display units 2.

(Operational Process)

Next, with reference to FIG. 8, an operational process according to the present embodiment will be described. FIG. 8 is a flowchart illustrating a display control process according to the present embodiment.

First of all, in step S200 of FIG. 8, the HMD 1 receives a position and a direction of the virtual camera 34 that are set by a user.

Next, in step S210, the HMD 1 transmits information report requests from the communication unit 26 of the HMD 1 to the nearby external cameras 32A to 32D. The information report requests request position information (such as latitude, longitude, and altitude) and direction information of each external camera 32 to be reported.

Next, in step S220, the external cameras 32A to 32D report information including the position information and the direction information to the HMD 1 in response to the information report requests from the HMD 1.

Subsequently, in step S230, the HMD 1 adjusts the angle of view (telephoto and wide) and an image-shooting direction (pan and tilt) of each external camera 32 in order to acquire an image according to the position and the direction of the virtual camera, which are set in S200. In the example of FIG. 8, adjustment instructions are issued to the external cameras 32B to 32D as an example.

Subsequently, in step S240, the HMD 1 transmits image acquisition requests to the external cameras 32B to 32D, to which the adjustment instructions have been issued. The image acquisition requests request captured images that have been captured by the external cameras 32 to be transmitted.

Next, in step S250, the external cameras 32B to 32D transmit the captured images to the HMD 1 in response to the image acquisition requests from the HMD 1.

Subsequently, in step S260, the HMD 1 performs calculation to generate an image (image considered to be captured by the virtual camera 34) according to the position and the direction that are set in S200, on the basis of the captured images acquired from the external cameras 32B to 32D. A calculation method is not limited in particular. For example, a method for generating a free viewpoint image disclosed in JP 2007-334583A may be used. More specifically, the HMD 1 can detect a parallax vector through block matching, and generate an image from a given viewpoint by use of the parallax vector.

In step S270, the HMD 1 displays, on the display units 2, the generated image from a third person viewpoint, which is namely an image considered to be captured by the virtual camera 34 whose position and direction are set in accordance with a user operation, and includes the user P within the angle of view.

<3-2. Control Process Performed by Server>

The display control process according to the above-described embodiment is performed by the HMD 1. However, the display control system according to an embodiment of the present disclosure is not limited thereto. A server connectable to the HMD 1 and the external cameras A to D may also perform the display control process. Next, with reference to FIGS. 9 to 10, the specific description will be made.

Figure 9:
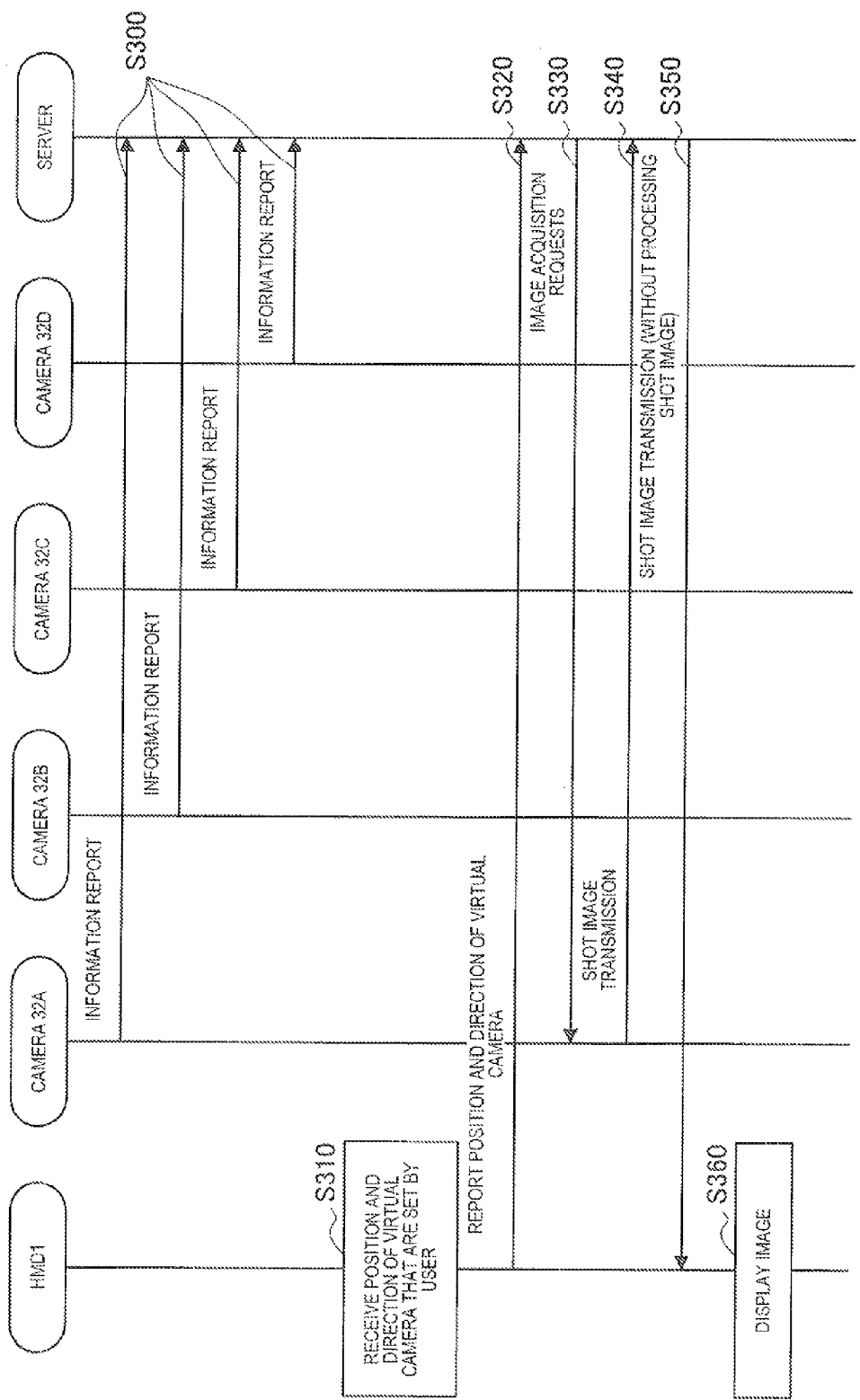
FIG. 9 is a flowchart illustrating a display control process in a display control system including a server.

FIG. 9 is a flowchart illustrating a display control process in a display control system including a server. First of all, as illustrated in FIG. 9, in step S300, each of the external cameras 32A to 32D reports information regarding a position and an image-shooting direction to the server when states of the position, the direction, and the like change. The server can hereby constantly grasp the states of the position, the image-shooting direction, and the like of each of the external cameras 32A to 32D.

Next, in step S310, the HMD 1 receives the position and the direction of the virtual camera 34 that are set by a user.

Subsequently, in step S320, the HMD 1 reports information regarding the set position and direction of the virtual camera 34 to the server.

Next, in step S330, the server transmits image acquisition requests to predetermined cameras 32 in order to acquire an image according to the position and the direction of the virtual camera 34, which are reported from the HMD 1 in S320. In the example of FIG. 9, supposing that a position and a direction of the external camera 32A are the same as the position and the direction of the virtual camera 34, the server transmits an image acquisition request to the external camera 32A.

Subsequently, in step S340, the external camera 32A transmits a captured image to the server in repose to the image acquisition request from the server.

Next, in step S350, the server transmits the captured image, which is transmitted from the external camera 32A, to the HMD 1 without processing the captured image. As described above, in the example of FIG. 9, the position and the direction of the external camera 32A are supposed to be the same as the position and the direction of the virtual camera 34. Accordingly, the server does not have to process the captured image acquired from the external camera 32A.

In step S360, the HMD 1 displays, on the display units 2, the captured image from a third person viewpoint transmitted from the server, which is namely an image that is considered to be captured by the virtual camera 34 whose position and direction have been set in accordance with a user operation, and includes the user P within the angle of view.

It is supposed in the above-described example that the position and the direction of the external camera 32A are the same as the position and the direction of the virtual camera 34. However, when positions and directions of the external cameras 32 are not the same as those of the virtual camera 34, the server may generate an image on the basis of captured images acquired from the multiple external cameras 32. With reference to FIG. 10, it will be described below that the server generates (processes) an image on the basis of the captured images acquired from the multiple external cameras 32.

FIG. 10 is a flowchart illustrating another display control process in the display control system including the server. Processes shown in step S300 to S320 of FIG. 10 are the same as the processes shown in the corresponding steps of FIG. 9. Accordingly, they will be here omitted.

Next, in step S400, the server adjusts the angle of view (telephoto and wide) and an image-shooting direction (pan and tilt) of each external camera 32 in order to acquire an image according to a position and a direction of the virtual camera 34, which are reported by the HMD 1 in S320. In the example of FIG. 10, adjustment instructions are issued to the external cameras 32B to 32D as an example.

Subsequently, in step S410, the server transmits image acquisition requests to the external cameras 32B to 32D, to which the adjustment instructions have been issued. The image acquisition requests request captured images captured by the external cameras 32 to be transmitted.

Next, in step S420, the external cameras 32B to 32D transmit the captured images to the server in response to the image acquisition requests from the server.

Subsequently, in step S430, the HMD 1 performs calculation to generate an image (image considered to be captured by the virtual camera 34) according to the position and direction reported in S320, on the basis of the captured images acquired from the external cameras 32B to 32D.

Next, in step S440, the server transmits the generated image to the HMD 1.

Subsequently, in step S450, the HMD 1 displays, on the display units 2, the image from a third person viewpoint transmitted from the server, which is namely an image that is considered to be captured by the virtual camera 34 whose position and direction are set in accordance with a user operation, and includes the user P within the angle of view.

<3-3. Another Device Example>

Figure 11A:
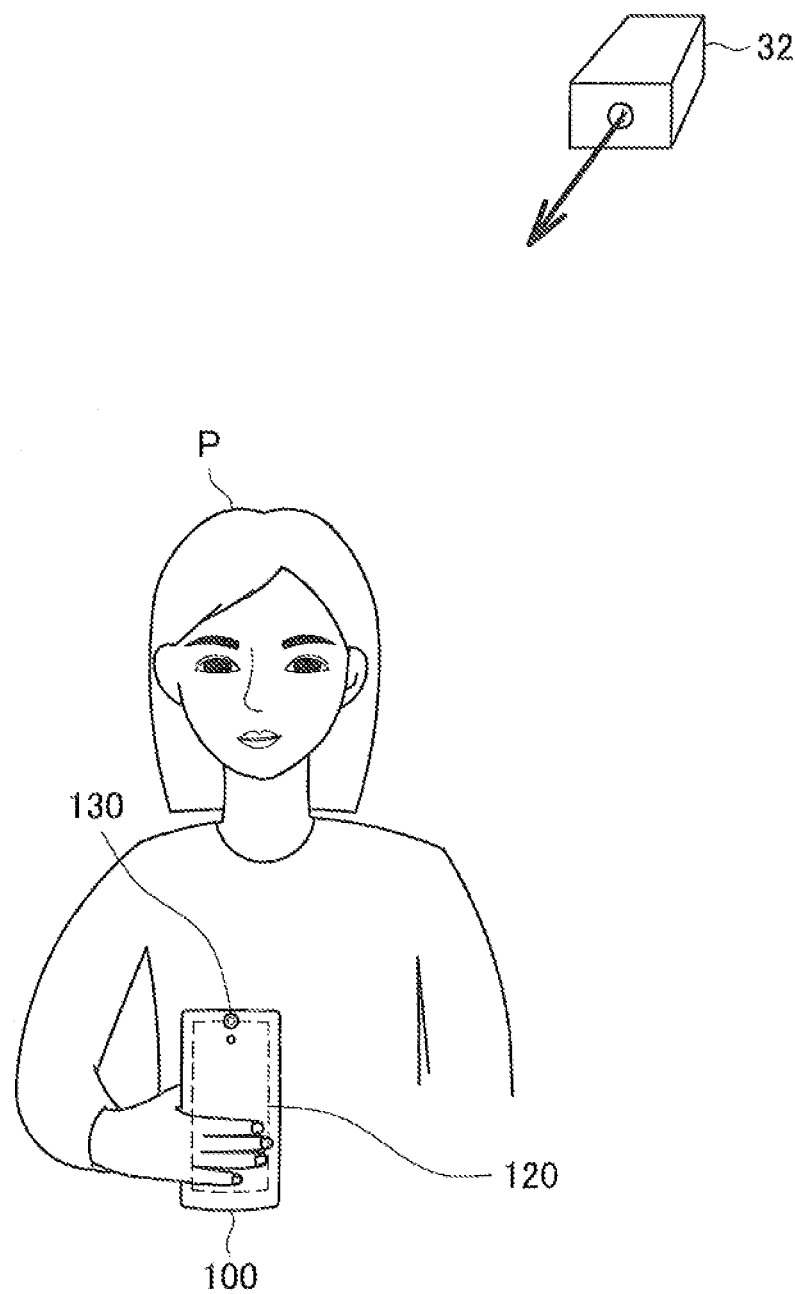
FIG. 11A is a diagram for describing a first system configuration example in which a scene (second captured image) from an out-of-body viewpoint is displayed on a display unit of a smartphone.
Figure 11B:
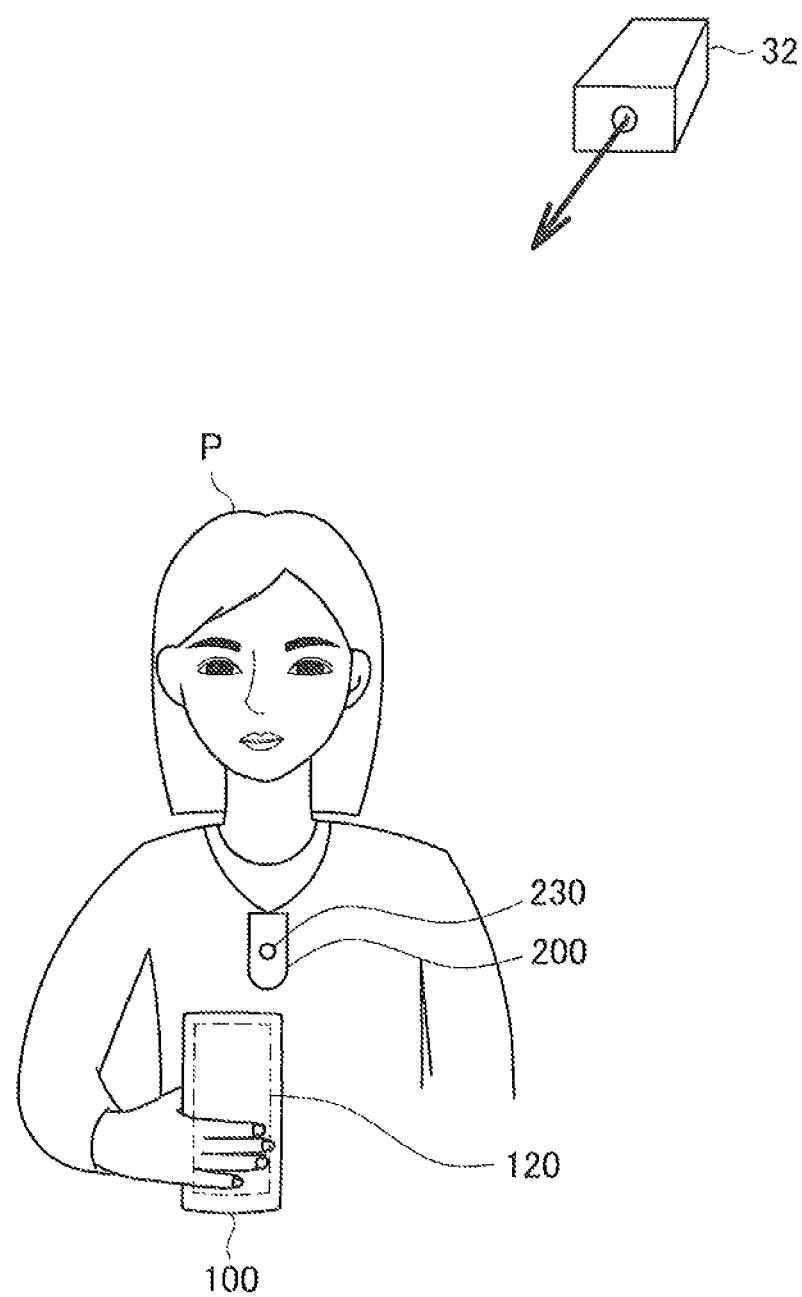
FIG. 11B is a diagram for describing a second system configuration example in which a scene (second captured image) from an out-of-body viewpoint is displayed on a display unit of a smartphone.

With reference to FIGS. 11A and 11B, a display control system will be specifically described in which an information processing apparatus according to an embodiment of the present disclosure is a device such as a smartphone other than the HMD 1 illustrated in FIGS. 1 and 2, for example.

FIG. 11A is a diagram for describing a first system configuration example that displays a scene (second captured image) from an out-of-body viewpoint on a display unit of a smartphone. As illustrated in FIG. 11A, a smartphone 100 includes a display unit 120 and an imaging unit 130. The imaging unit 130 is a first imaging unit that is installed on an outer surface of the smartphone 100 and can shoot an image of an area in an eye-gaze direction of the user P.

The smartphone 100 configured in this way displays, on the display unit 120, a shot image (first captured image) from a user viewpoint (first person viewpoint), which is shot by the imaging unit 130 (first imaging unit), in the first display control mode.

Next, when the user P issues an out-of-body instruction, the smartphone 100 switches the display control mode to the second display control mode. Specifically, the smartphone 100 displays, on the display unit 120, a captured image (second captured image) from an out-of-body viewpoint (third person viewpoint), which is captured by a nearby external camera 32 (second imaging unit), and includes the user P within the angle of view, in the second display control mode.

In this way, for example, the display control system according to an embodiment of the present disclosure may be applied to the smartphone 100 in addition to the HMD 1. In the example of FIG. 11A, the imaging unit 130 that is integrated with the smartphone 100 is used as a first imaging unit, but the first imaging unit according to an embodiment of the present disclosure is not limited thereto. For example, an imaging unit may be installed separately from the smartphone 100. With reference to 11B, the specific description will be made below.

FIG. 11B is a diagram for describing a second system configuration example in which a scene (second captured image) from an out-of-body viewpoint is displayed on a display unit of a smartphone. As illustrated in FIG. 11B, the user P wears a wearable apparatus 200 that is referred to as a so-called life log and can continuously shoot and record external information. In this case, when an imaging unit 230 of the wearable apparatus 200 can shoot an image of an area in an eye-gaze direction of the user P, the imaging unit 230 can be used as a first imaging unit in the present display control system.

Specifically, the smartphone 100 receives a shot image (first captured image) from a user viewpoint (first person viewpoint), which is shot by the imaging unit 230 (first imaging unit) of the wearable apparatus 200, and displays the received shot image on the display unit 120 of the smartphone 100 in the first display control mode.

The smartphone 100 displays, on the display unit 120, a captured image (second captured image) from an out-of-body viewpoint, which is captured by the external camera 32 (second imaging unit), and includes the user P within the angle of view, in the second display control mode in the same way as described for the system configuration illustrated in FIG. 11A.

In this way, the smartphone 100 (information processing apparatus) according to the present embodiment may use an imaging unit that is installed separately from the smartphone 100 (information processing apparatus), as a first imaging unit.

<<4. Conclusion>>

As described above, an image of the real world from a third person viewpoint, from which a user is overlooked, is displayed in real time on the display units 2 in the display control system according to the present embodiment. The user can hereby feel as if the user actually floated outside the body.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, a computer program can also be created for causing hardware such as a CPU, ROM, and RAM built in the above-described HMD 1 to execute the same functions as the functions of the above-described structural elements of the HMD 1. There is also provided a computer-readable storage medium having the computer program stored therein.

An image of the real world from a third person viewpoint, from which a user is overlooked, is displayed on the display units 2 in real time. The user can hereby undergo an out-of-body experience and easily grasp a surrounding situation when a disaster occurs, it is dark outside, or the user is lost, for example.

Additionally, the present technology may also be configured as below.

(1) An information processing apparatus including:

a display control unit configured to include a first display control mode in which control is performed in a manner that a first image from a user viewpoint, which is captured by a first imaging unit, is displayed on a display unit or control is performed in a manner that the display unit is transmissive, and a second display control mode in which control is performed in a manner that a second image captured by a second imaging unit including a user within an angle of view is displayed on the display unit; and a switching control unit configured to perform control in response to an instruction from the user in a manner that a display control mode of the display control unit is switched from the first display control mode to the second display control mode.

(2) The information processing apparatus according to (1), wherein the display unit is a display unit capable of being subjected to transmittance control, and wherein the display control unit switches, in accordance with control performed by the switching control unit, the first display control mode in which control is performed in a manner that the display unit is transmissive to the second display control mode in which control is performed in a manner that the second image captured by the second imaging unit including the user within the angle of view is displayed on the display unit.

(3) The information processing apparatus according to (1), wherein the display control unit switches, in accordance with control performed by the switching control unit, the first display control mode in which the first image from the user viewpoint is displayed on the display unit to the second display control mode in which control is performed in a manner that the second image captured by the second imaging unit including the user within the angle of view is displayed on the display unit, the first image being captured by the first imaging unit.

(4) The information processing apparatus according to (1) or (2), wherein, when switching the display control mode to the second display control mode, the display control unit generates a transition image indicating that the display control mode is being switched based on the first image from the user viewpoint and the second image, and displays the transition image on the display unit, the first image being captured by the first imaging unit.

(5) The information processing apparatus according to any one of (1) to (4), wherein the display unit is installed on an HMD and disposed in front of an eye of the user, the HMD being worn on a head or a face of the user.

(6) The information processing apparatus according to any one of (1) to (5), wherein the switching control unit receives the instruction from the user in a form of an operation input, an eye-gaze input, an audio input, a gesture input, a myoelectric input, or a brain wave input.

(7) The information processing apparatus according to any one of (1) to (6), wherein the display control unit displays an indicator indicating a position of the user on the second image.

(8) The information processing apparatus according to any one of (1) to (7), wherein the display control unit generates, as the second image, a virtual captured image that includes the user within the angle of view from a position according to the instruction from the user, and displays the generated image on the display unit in the second display control mode.

(9) The information processing apparatus according to any one of (1) to (8), further including:

an audio output control unit configured to perform control in a manner that a predetermined sound effect is output when the switching control unit switches the display control mode.

(10) The information processing apparatus according to any one of (1) to (9), wherein the first imaging unit is installed on an HMD and disposed in a manner that the first imaging unit captures an image of an area in an eye-gaze direction of the user, the HMD being worn on a head or a face of the user.

(11) The information processing apparatus according to any one of (1) to (10), wherein the second imaging unit is a fixed camera installed around the user.

(12) The information processing apparatus according to any one of (1) to (11), wherein the second imaging unit is a camera mounted on a flying object.

(13) The information processing apparatus according to any one of (1) to (12), wherein the second imaging unit includes multiple super-wide cameras installed on a HMD, the HMD being worn on a head or a face of the user, and wherein the display control unit generates the second image in the second display control mode based on multiple captured images captured by the multiple super-wide cameras.

(14) The information processing apparatus according to any one of (1) to (13), wherein the display unit includes an inner display unit configured to display the second image, and an outer display unit configured to face an opposite side to the inner display unit, and wherein the display control unit performs control in the second display control mode in a manner that an image indicating that the display control mode has been switched to the second display control mode is displayed on the outer display unit.

(15) A non-transitory computer-readable recording medium having a program recorded thereon, the program causing a computer to function as:

a display control unit configured to include a first display control mode in which control is performed in a manner that a first image from a user viewpoint, which is captured by a first imaging unit, is displayed on a display unit or control is performed in a manner that the display unit is transmissive, and a second display control mode in which control is performed in a manner that a second image captured by a second imaging unit including a user within an angle of view is displayed on the display unit; and a switching control unit configured to perform control in response to an instruction from the user in a manner that a display control mode of the display control unit is switched from the first display control mode to the second display control mode.

What is claimed is:

1. An information processing apparatus comprising:
    a display control unit configured to include:
        a first display control mode in which control is performed in a manner that a first image from a user viewpoint, which is captured by a first imaging unit, is displayed on a display unit or control is performed in a manner that the display unit is in a transparent or semitransparent state, wherein the first image is an image of an area in a direction visually recognized by the user, and
        a second display control mode in which control is performed in a manner that a second image is displayed on the display unit, wherein the second image is captured by a second imaging unit and includes the user within an angle of view of the second imaging unit; and
    a switching control unit configured to perform control in response to an instruction from the user in a manner that a display control mode of the display control unit is switched from the first display control mode to the second display control mode.

2. The information processing apparatus according to claim 1,
    wherein the display unit is capable of being subjected to transmittance control in which the display unit is in the transparent or semitransparent state in the first display control mode, and
    wherein the display control unit switches, in accordance with control performed by the switching control unit, the first display control mode in which control is performed in a manner that the display unit is in the transparent or semitransparent state to the second display control mode in which control is performed in a manner that the second image is displayed on the display unit.

3. The information processing apparatus according to claim 1, wherein the display control unit switches, in accordance with control performed by the switching control unit, the first display control mode in which the first image from the user viewpoint is displayed on the display unit to the second display control mode in which control is performed in a manner that the second image is displayed on the display unit.

4. The information processing apparatus according to claim 1, wherein, when switching the display control mode to the second display control mode, the display control unit generates a transition image indicating that the display control mode is being switched based on the first image from the user viewpoint and the second image, and displays the transition image on the display unit.

5. The information processing apparatus according to claim 1, wherein the display unit is installed on a head-mounted display (HMD) and disposed in front of an eye of the user, the HMD being worn on a head or a face of the user.

6. The information processing apparatus according to claim 1, wherein the switching control unit receives the instruction from the user in a form of an operation input, an eye-gaze input, an audio input, a gesture input, a myoelectric input, or a brain wave input.

7. The information processing apparatus according to claim 1, wherein the display control unit displays an indicator indicating a position of the user on the second image.

8. The information processing apparatus according to claim 1, wherein the display control unit generates, as the second image, a virtual captured image that includes the user within the angle of view from a position according to the instruction from the user, and displays the generated virtual captured image on the display unit in the second display control mode.

9. The information processing apparatus according to claim 1, further comprising:
    an audio output control unit configured to perform control in a manner that a predetermined sound effect is output when the switching control unit switches the display control mode.

10. The information processing apparatus according to claim 1, wherein the first imaging unit is installed on a head-mounted display (HMD) and disposed in a manner that the first imaging unit captures an image of an area in an eye-gaze direction of the user, the HMD being worn on a head or a face of the user.

11. The information processing apparatus according to claim 1, wherein the second imaging unit is a fixed camera installed around the user.

12. The information processing apparatus according to claim 1, wherein the second imaging unit is a camera mounted on a flying object.

13. The information processing apparatus according to claim 1,
    wherein the second imaging unit includes multiple super-wide cameras installed on a head-mounted display (HMD), the HMD being worn on a head or a face of the user, and
    wherein the display control unit generates the second image in the second display control mode based on multiple captured images captured by the multiple super-wide cameras.

14. The information processing apparatus according to claim 1,
    wherein the display unit includes an inner display unit configured to display the second image, and an outer display unit configured to face an opposite side to the inner display unit, and
    wherein the display control unit performs control in the second display control mode in a manner that an image indicating that the display control mode has been switched to the second display control mode is displayed on the outer display unit.

15. The information processing apparatus according to claim 1,
wherein, in the second display control mode, the display control unit is configured to sequentially display a plurality of the second images, wherein each of the plurality of the second images is captured with a different angle of view of the second imaging unit.

16. A non-transitory computer-readable recording medium having a set of computer-executable instructions recorded thereon, the instructions when executed by a computer causing the computer to function as:
a display control unit configured to include:
a first display control mode in which control is performed in a manner that a first image from a user viewpoint, which is captured by a first imaging unit, is displayed on a display unit or control is performed in a manner that the display unit is a transparent or semitransparent state, wherein the first image is an image of an area in a direction visually recognized by the user, and
a second display control mode in which control is performed in a manner that a second image is displayed on the display unit, wherein the second image is captured by a second imaging unit and includes the user within an angle of view of the second imaging unit; and
a switching control unit configured to perform control in response to an instruction from the user in a manner that a display control mode of the display control unit is switched from the first display control mode to the second display control mode.

* * * * *